(12) United States Patent
Critchley

(10) Patent No.: US 8,905,445 B2
(45) Date of Patent: Dec. 9, 2014

(54) VEHICLE BUMPER

(75) Inventor: David John Critchley, Oak Ridge, NC (US)

(73) Assignee: Volvo Group North America, LLC, Greensboro, NC (US)

(*) Notice: Subject to any disclaimer, the term of this patent is extended or adjusted under 35 U.S.C. 154(b) by 0 days.

(21) Appl. No.: 13/698,726

(22) PCT Filed: Jun. 7, 2010

(86) PCT No.: PCT/US2010/037579
§ 371 (c)(1),
(2), (4) Date: Nov. 19, 2012

(87) PCT Pub. No.: WO2011/155920
PCT Pub. Date: Dec. 15, 2011

(65) Prior Publication Data
US 2013/0062894 A1    Mar. 14, 2013

(51) Int. Cl.
*B60R 19/38* (2006.01)
*B60R 19/04* (2006.01)
*B60R 19/18* (2006.01)
*B62D 25/10* (2006.01)
*B60R 19/24* (2006.01)

(52) U.S. Cl.
CPC ............ *B60R 19/18* (2013.01); *B62D 25/10* (2013.01); *B60R 2019/1886* (2013.01); *B60R 2019/247* (2013.01)
USPC ............................ 293/149; 293/102; 293/155

(58) Field of Classification Search
USPC ............ 293/102, 149, 150, 154, 155; 296/187.09, 190.05, 193.09, 193.11; 180/89.16–89.19
See application file for complete search history.

(56) References Cited

U.S. PATENT DOCUMENTS

| 2,672,363 | A | | 3/1954 | Buchanan |
| 2,699,223 | A | | 1/1955 | Brumbaugh |
| 2,740,487 | A | | 4/1956 | Murty et al. |
| 2,854,088 | A | | 9/1958 | Dence |
| 2,954,256 | A | | 9/1960 | Barenyi |
| 3,005,657 | A | | 10/1961 | Walker |
| 3,217,354 | A | | 11/1965 | May |
| 3,596,963 | A | | 8/1971 | Phillips |
| 3,820,834 | A | | 6/1974 | Wilful et al. |
| 3,884,517 | A | * | 5/1975 | Davidson ...................... 293/150 |
| 3,907,352 | A | * | 9/1975 | Spain et al. .................... 293/152 |
| 4,141,427 | A | | 2/1979 | Kirchweger et al. |
| 4,225,167 | A | * | 9/1980 | Buettner et al. .............. 293/120 |
| 4,320,913 | A | * | 3/1982 | Kuroda ......................... 293/120 |
| 4,402,537 | A | * | 9/1983 | Gallitzendorfer et al. .... 293/149 |
| 4,422,680 | A | | 12/1983 | Goupy |
| 4,972,913 | A | | 11/1990 | Ray et al. |
| 5,000,499 | A | * | 3/1991 | Shephard et al. ............. 293/150 |
| 6,109,676 | A | * | 8/2000 | Avis et al. ..................... 293/149 |
| 6,454,035 | B1 | | 9/2002 | Waskow et al. |

(Continued)

OTHER PUBLICATIONS

International Search Report for PCT/US2010/037579.

*Primary Examiner* — Gregory Blankenship
(74) *Attorney, Agent, or Firm* — Michael Pruden; Martin Farrell

(57) ABSTRACT

The present invention relates to a vehicle that includes a hood and a bumper. The hood is provided with open position and a closed position. The bumper is provided with an intermediate bumper portion, a first end cap, and a second end cap. The first and second bumper end caps are supported by the hood and are moveable with the hood as the hood transitions between the open and closed positions.

19 Claims, 13 Drawing Sheets

(56) References Cited

U.S. PATENT DOCUMENTS

| | | | |
|---|---|---|---|
| 6,767,039 B2* | 7/2004 | Bird | 293/154 |
| 6,932,397 B2* | 8/2005 | Svendsen et al. | 293/117 |
| 7,063,364 B2* | 6/2006 | Bird et al. | 293/154 |
| 7,086,673 B2* | 8/2006 | Connett et al. | 293/118 |
| 7,766,402 B2* | 8/2010 | Schmidt et al. | 293/117 |
| 2004/0183318 A1* | 9/2004 | Bird et al. | 293/149 |
| 2006/0097526 A1* | 5/2006 | Connett et al. | 293/118 |
| 2006/0197347 A1 | 9/2006 | Hoffman et al. | |
| 2007/0096482 A1* | 5/2007 | Matsui et al. | 293/154 |
| 2013/0062894 A1* | 3/2013 | Critchley | 293/149 |

* cited by examiner

VEHICLE BUMPER

FIELD OF THE INVENTION

The present invention relates to an improved vehicle bumper provided with bumper end caps mounted to the hood.

BACKGROUND OF THE INVENTION

Many vehicles, including, for example, automobiles, light trucks, and heavy trucks, are provided with bumpers that absorb impacts and limit damage to the vehicle. During very light impacts, bumpers are typically designed to absorb the impact energy without being significantly damaged.

While bumpers may avoid damage during very light impacts, during heavier impacts damage to any portion of the bumper may entail complete and expensive replacement of the entire bumper system, including the bumper itself and any brackets or supports used to mount the bumper. While existing bumper systems are known that employ an elongated central bumper section provided with opposite ends attached to a pair of bumper end caps, each of which may be independently replaced in the event of damage, such an arrangement may require additional reinforcement for the bumper end caps since they extend in a cantilevered fashion at some distance from an attachment point to the elongated center bumper section. For example, additional struts may be required to support the outer edge of the bumper end caps.

In certain vehicles, for example, typically in heavy trucks and buses, the hood may be opened by forward rotation oldie hood. Hoods in such vehicles may be mounted using rubber bushing at the hinges for purposes of isolating the hood from chassis vibration. The use of such bushings imparts a degree of flexibility to the hood and may cause the hood to contact the bumper if a sufficient gap between the bumper and the hood is not provided. In addition to decreasing aerodynamic efficiency of the vehicle, the inclusion of a gap may reduce the aesthetic appearance of the front end of the vehicle.

Another characteristic of vehicles, particularly, but not limited to, vehicles with forward rotating hoods, is that the ends of the bumper may limit access to the engine bay of the vehicle, such as, for example, when servicing the engine. While bumpers have been devised that are pivotable with the hood, there is a risk that an impact to the bumper may result in damage to the hood and require costly repair or replacement of the hood. Additionally, while bumper arrangements have been devised that include a center bumper section and pivotable bumper end caps, which are pivotable independently of the hood and a center bumper section, additional brackets must be employed, installation and repair of the bumper end caps may be time consuming, and due to inherent variations from vehicle to vehicle it may be difficult to align the bumper end caps with respect to the both the hood and the center bumper section. Misalignment may result in an awkward appearance, unintended or non-uniform gaps, and dissatisfied owners or increased warranty claims.

The present invention relates to an improved vehicle bumper provided with bumper end caps mounted to the hood.

SUMMARY OF THE INVENTION

According to one embodiment of the present invention a vehicle comprises a frame, a hood, and a bumper. The hood is provided with an open position and a closed position. The bumper is provided with an intermediate bumper portion, a first bumper end cap, and a second bumper end cap, wherein the intermediate bumper portion is located between the first and second bumper end caps. The intermediate bumper portion is supported by the frame, whereby the hood moves relative to the intermediate bumper portion as the hood transitions between the open and closed positions. The first and second bumper end caps are supported by the hood and are moveable with the hood as the hood transitions between the open and closed positions.

According to another embodiment of the present invention a vehicle comprises a frame, a hood, and a bumper. The hood is provided with an open position and a closed position. The bumper is provided with an intermediate bumper portion, a first bumper end cap, and a second bumper end cap. The first and second bumper end caps are supported by the hood and are moveable with the hood as the hood transitions between the open and closed positions. The first bumper end cap is provided with means for preventing or limiting damage to the hood during impacts to the first bumper end cap. The second bumper end cap is provided with means for preventing or limiting damage to the hood during impacts to the second bumper end cap.

According to yet another embodiment of the present invention a vehicle comprises a frame, a hood, and a bumper. The hood provided with an open position and a closed position. The bumper is provided with three discrete sections including an intermediate bumper portion, a first bumper end cap, and a second bumper end cap. The first and second bumper end caps are supported by the hood and are moveable with the hood as the hood transitions between the open and closed positions. At least one releasable attachment releasably connects the first bumper end cap to the hood. At least one other releasable attachment releasably connects the second bumper end cap to the hood. A first pivot point attachment connects the first bumper end cap to the hood whereby the first bumper end cap is pivotable about the first pivot point attachment and relative to the hood when the first bumper end cap is unconnected to the hood via the at least one releasable attachment. A second pivot point attachment connects the second bumper end cap to the hood whereby the second bumper end cap is pivotable about the second pivot point attachment and relative to the hood when the second bumper end cap is unconnected to the hood via the at least one other releasable attachment.

According to still another embodiment of the present invention, a method for preventing damage to a vehicle hood supporting first and second bumper end caps that are moveable with the hood as the hood transitions between open and closed positions, comprises the steps of configuring at least a portion of the first bumper end cap to disassociate from the hood during an impact to the first bumper end cap of sufficient force to damage the hood and configuring at least a portion of the second bumper end cap to disassociate from the hood during an impact to the second bumper end cap of sufficient force to damage the hood.

According to still another embodiment of the present invention, a method for preventing damage to a vehicle hood supporting first and second bumper end caps that are moveable with the hood as the hood transitions between open and closed positions, comprises the steps of configuring the first bumper end cap to pivot relative to the hood during an impact to the first bumper end cap of sufficient force to damage the hood and configuring the second bumper end cap to pivot relative to the hood during an impact to the second bumper end cap of sufficient force to damage the hood.

DETAILED DESCRIPTION OF THE INVENTION

Figure 1:
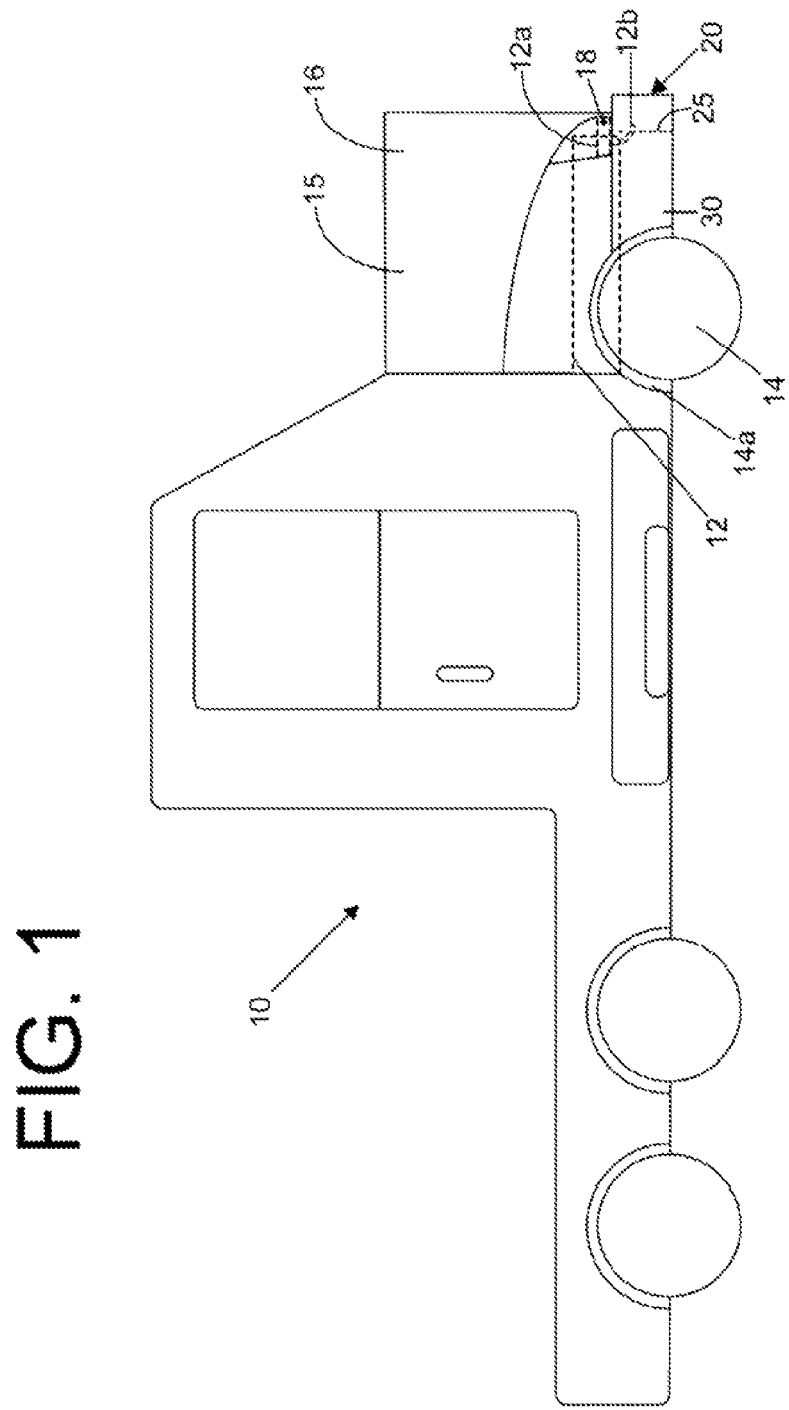
FIG. 1 shows a side view of a vehicle with a hood in a closed position and a bumper according to one embodiment of the present invention.
Figure 2:
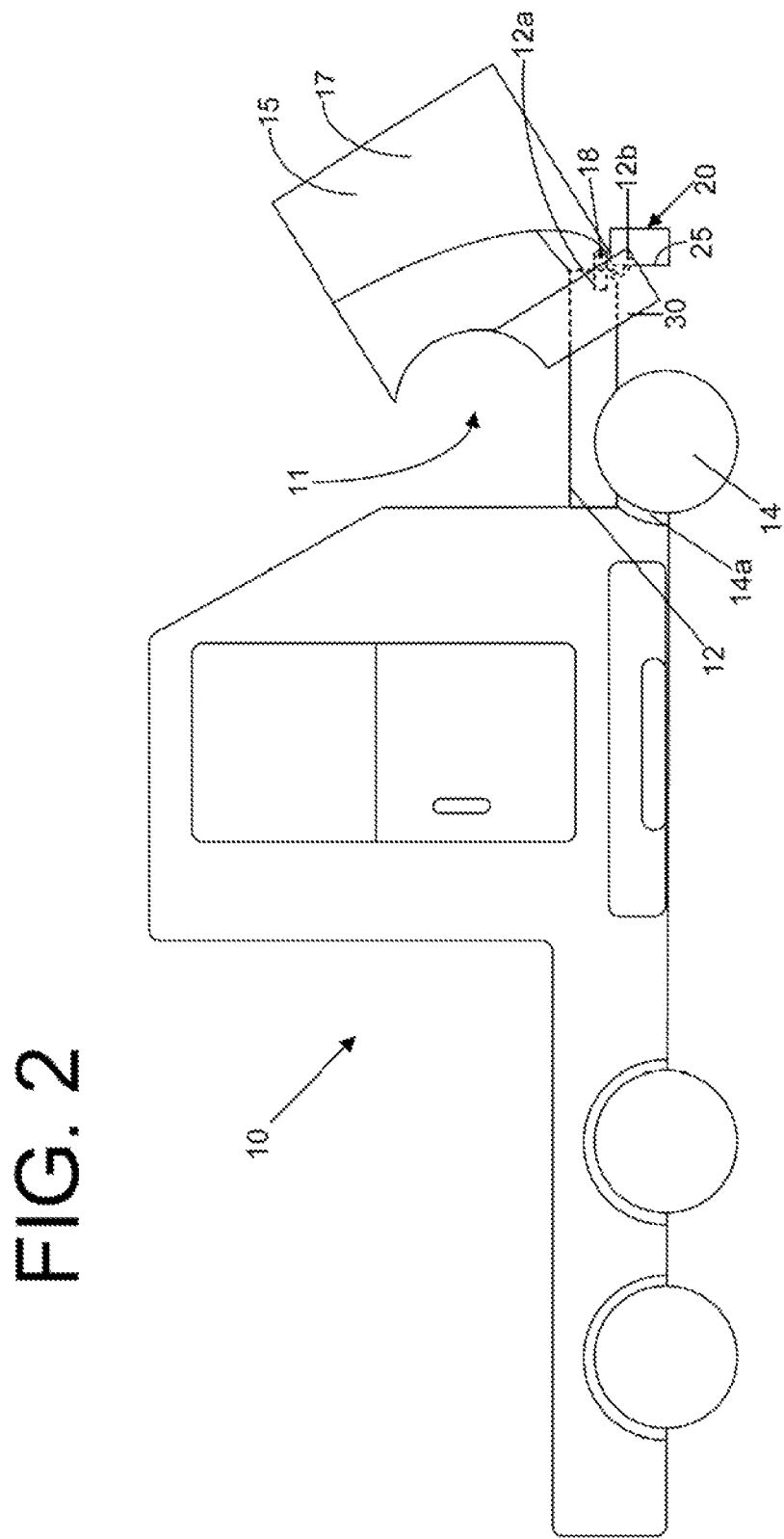
FIG. 2 shows a side view of a vehicle with as hood in an open position and a bumper according to one embodiment of the present invention.
Figure 3:
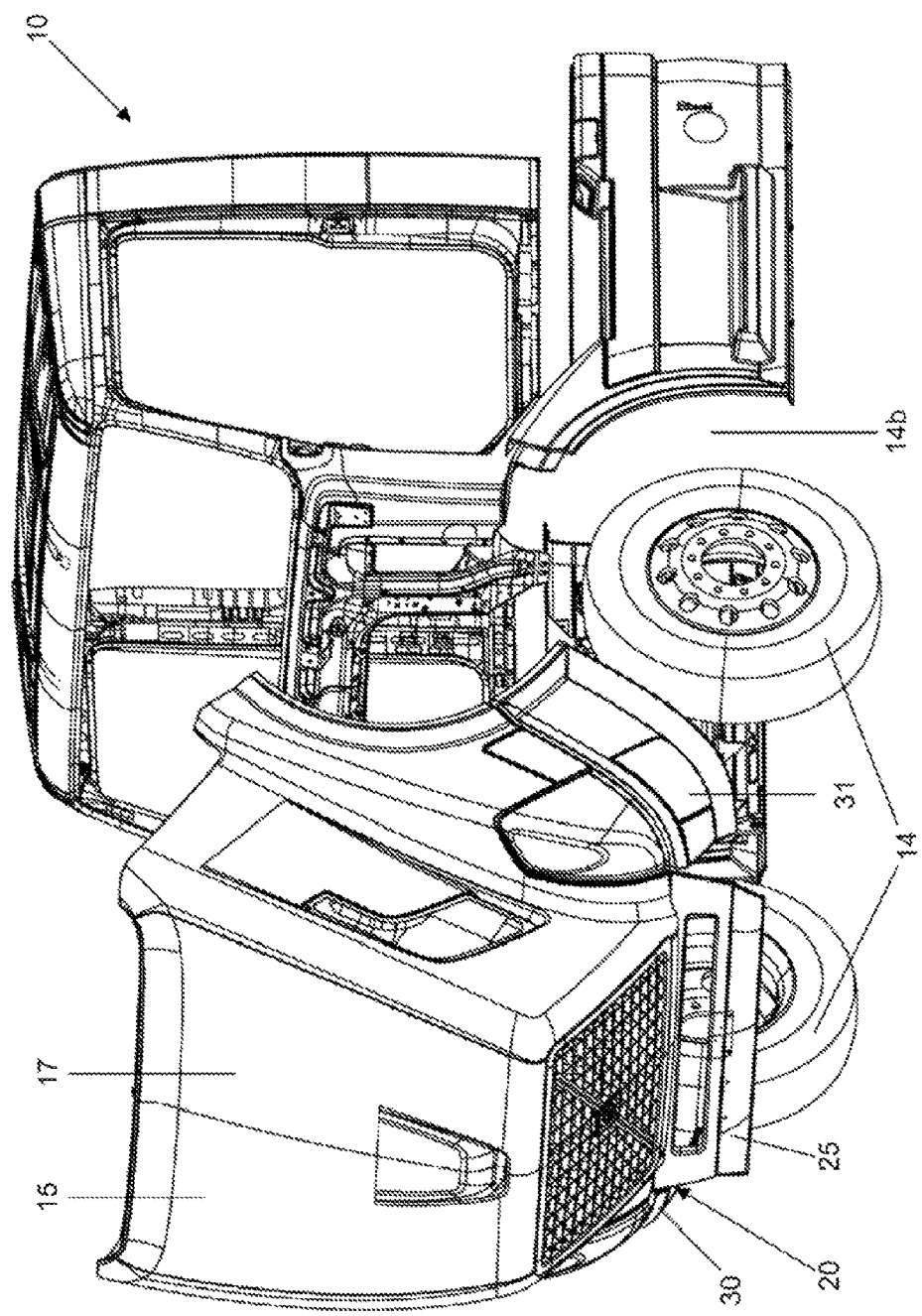
FIG. 3 shows a forward view of a vehicle with a hood in an open position and a bumper according to one embodiment of the present invention.

FIGS. 1 and 2 depict a vehicle 10 provided with a hood 15 and bumper 20 according to one embodiment of the present invention. As shown, the vehicle 10 may be a conventional truck tractor; however, those of ordinary skill in the art will appreciate, that it is within the scope of the present invention to practice the principals of the present invention in conjunction with any type of vehicle.

As shown by the present embodiment, the hood 15 may be forward rotating and journaled to one or more mounting brackets 12a connected to the vehicle frame 12. In the present embodiment shown, the mounting brackets 12a are positioned towards the front of an engine bay 11, which receives an engine (not shown).

According to one aspect of the present embodiment, the hood 15 is provided with a closed position 16 whereat the hood 15 encloses the engine bay 11 and an open position 17, which permits access to the engine bay 11. As shown, for example, in FIGS. 1 and 2, the hood 15 rotates about a hood axis of rotation 18 as it transitions between the closed hood position 16, shown in FIG. 1, and an open hood position 17, shown in FIG. 2. As shown by the present embodiment, the hood axis of rotation 18 may extend through the one or more mounting brackets 12a, whereby the hood 15 rotates in a generally forward direction, relative to the engine bay 11, as it opens.

Turning now to FIGS. 1-10, the bumper 20 according to one embodiment is shown. As shown, the bumper 20 is provided with at least three discrete sections, including at least one intermediate bumper portion 25, a first bumper end cap 30, and a second bumper end cap 31. Advantageously, since the intermediate bumper portion 25 and bumper end caps 30 and 31 are discrete sections in the present embodiment, damage to one of these sections 25, 30, or 31 from an impact may only necessitate replacement or repair of only the particular damaged section 25, 30, or 31, rather than the entire bumper 20.

Figure 4:
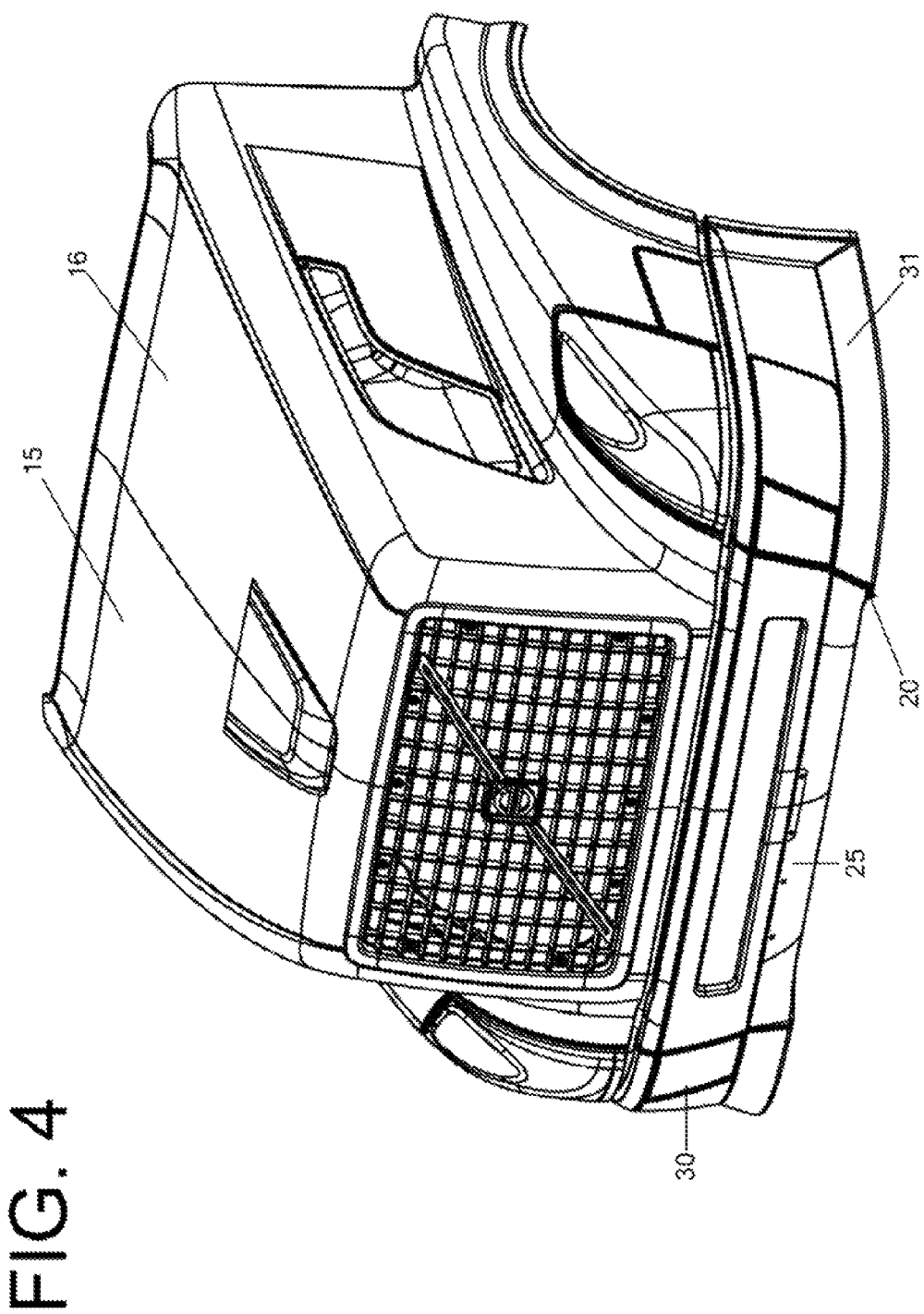
FIG. 4 shows a forward perspective view of a vehicle hood in a closed position and a bumper according to one embodiment of the present invention.
Figure 5:
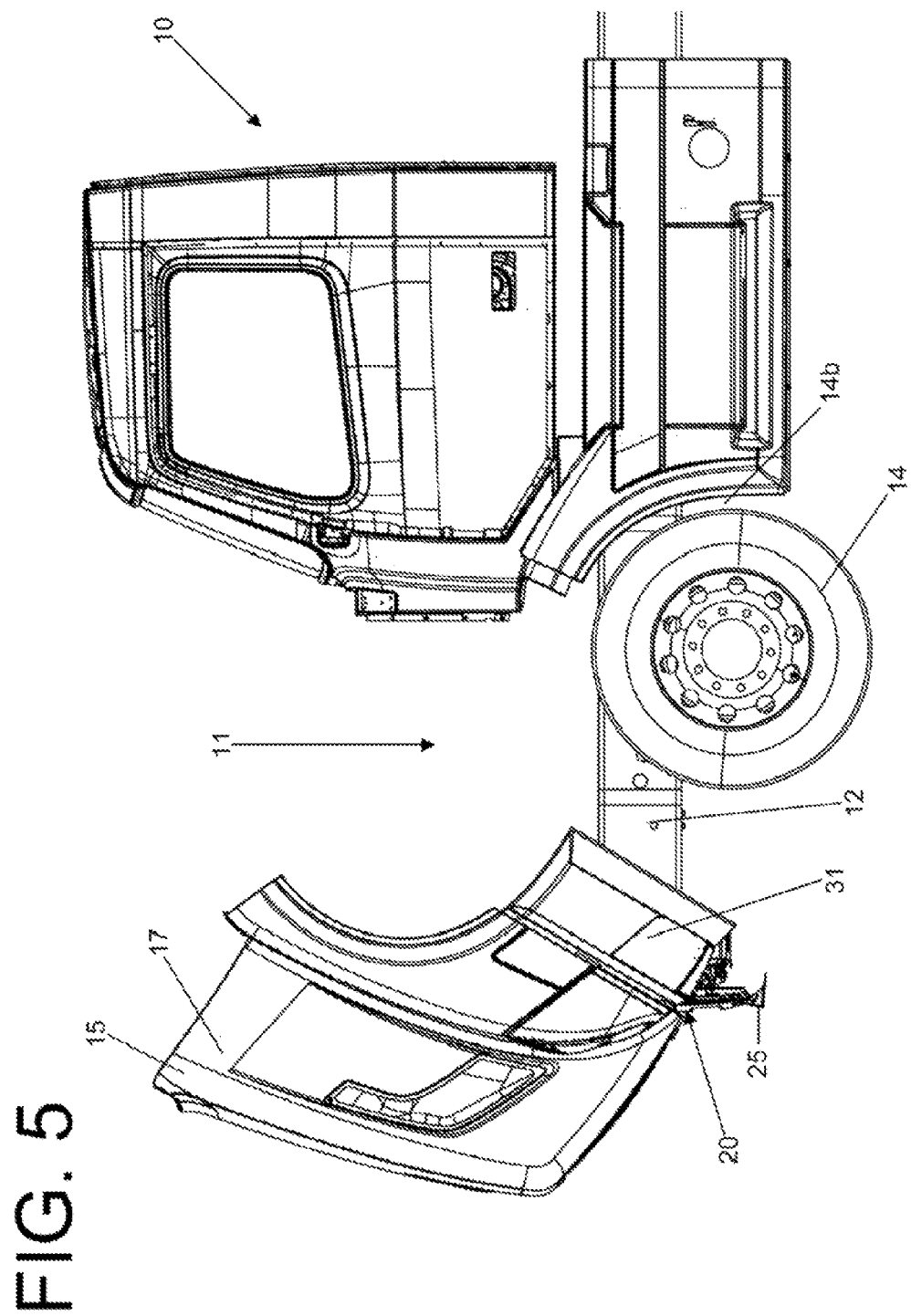
FIG. 5 shows a side view of a vehicle with a hood in an open position and a bumper according to one embodiment of the present invention.
Figure 6:
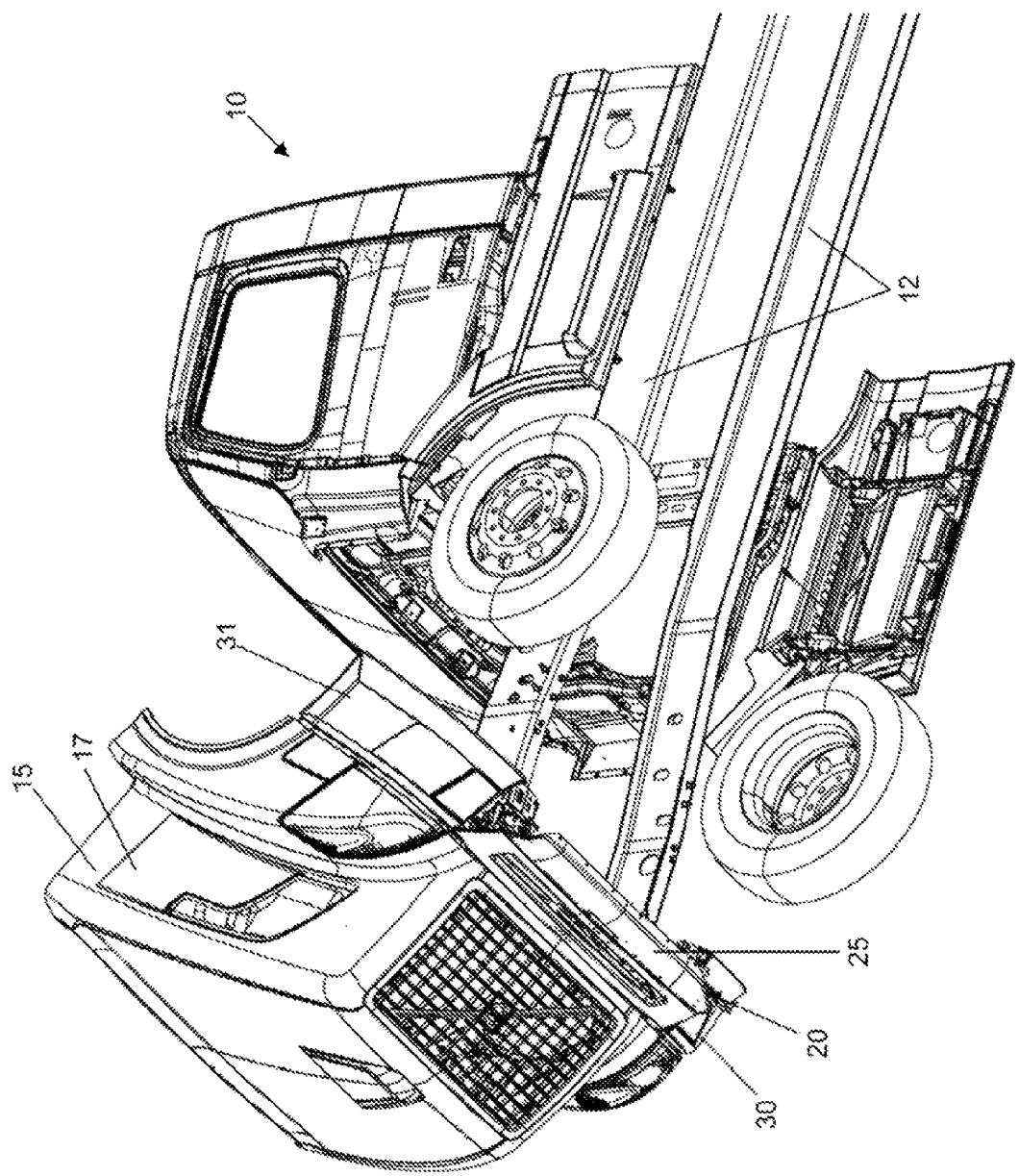
FIG. 6 shows an underside view of a vehicle with a hood in an open position and a bumper according to one embodiment of the present invention.
Figure 7:
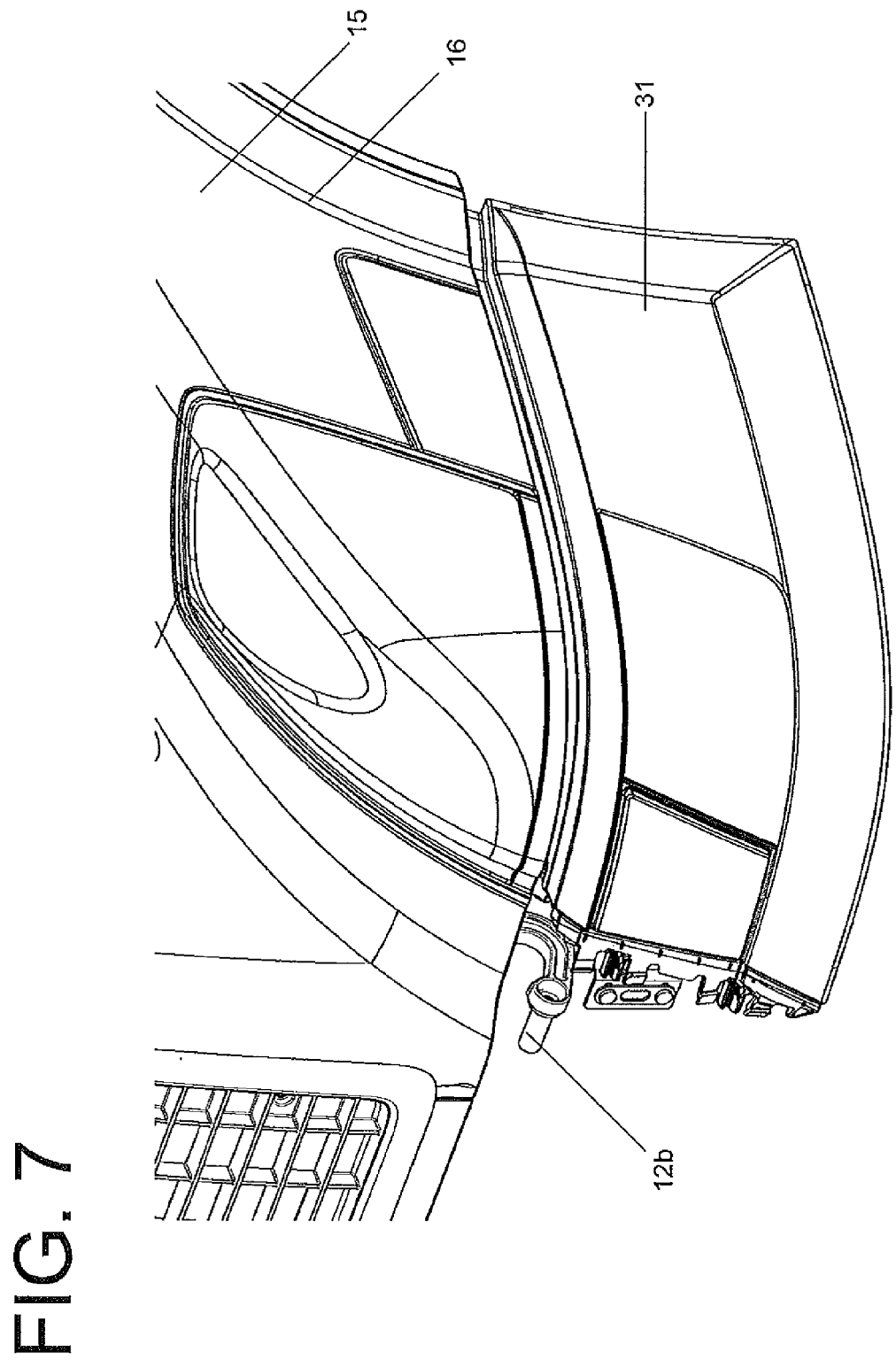
FIG. 7 shows a close up forward view a vehicle hood and a bumper end cap according to one embodiment of the present invention.

FIG. 4 depicts the intermediate bumper portion 25 is located between the first and second bumper end caps 30, 31. Also shown, the intermediate bumper portion 25 of the present embodiment preferably extends from the first bumper end cap 30 to the second bumper end cap 31. As shown, for example, in FIG. 1, the first bumper end cap 30 and the second bumper end cap 31 may extend from the intermediate bumper portion 25 to respective wheel wells 14a, 14b, whereby the first and second bumper end caps 30, 31 define, in part, the wheel wells 14a, 14b which receive the front wheels 14 of the vehicle 10.

As shown best in FIGS. 1, 2, 5, and 7, in the present embodiment, the intermediate bumper portion 25 is preferably connected to the frame 12 of the vehicle 10. The intermediate bumper portion 25 of the present embodiment may be connected to the frame 12 in any manner whereby the frame 12 supports the intermediate bumper portion 25, including, by way of example, and not limitation, via one or more frame brackets 12b. As shown in FIGS. 1-6, in the present embodiment, the intermediate bumper portion 25 is supported by the fame 12 whereby the hood 15 moves relative to the intermediate bumper portion 25 as the hood 15 transitions between the closed and open positions 16, 17.

Turning again to FIGS. 1-6, according to another aspect of the present embodiment, the bumper end caps 30, 31 are connected to the hood 15 of the vehicle 10. The bumper end caps 30, 31 of the present embodiment may be connected to the hood 15 in a number of manners whereby the hood 15 supports the bumper end caps 30, 31, including, by way of example, and not limitation via attachments 50, 51 shown in FIG. 8. As shown in FIGS. 1-6, in the present embodiment, the bumper end caps 30, 31 are supported by the hood 15 whereby the bumper end caps 30, 31 are moveable with the hood 15 as the hood 15 transitions between the closed and open positions 16, 17.

According to one aspect of the present embodiment, the bumper end caps 30, 31 are provided with means for preventing or limiting damage to the hood 15 during impacts to the bumper end caps 30, 31. According to another aspect of the present embodiment, the means for preventing or limiting damage to the hood 15 during impacts to the bumper end caps 30, 31 may include a means for pivoting the bumper end caps 30, 31 relative to the hood 15 during an impact to the bumper end caps 30, 31. According to yet another aspect of the present embodiment, the means for preventing damage to the hood 15 during impacts to the bumper end caps 30, 31 may include a means for disassociating at least a portion of the bumper end caps 30, 31 from the hood 15 during an impact to the bumper end caps 30, 31.

Figure 8:
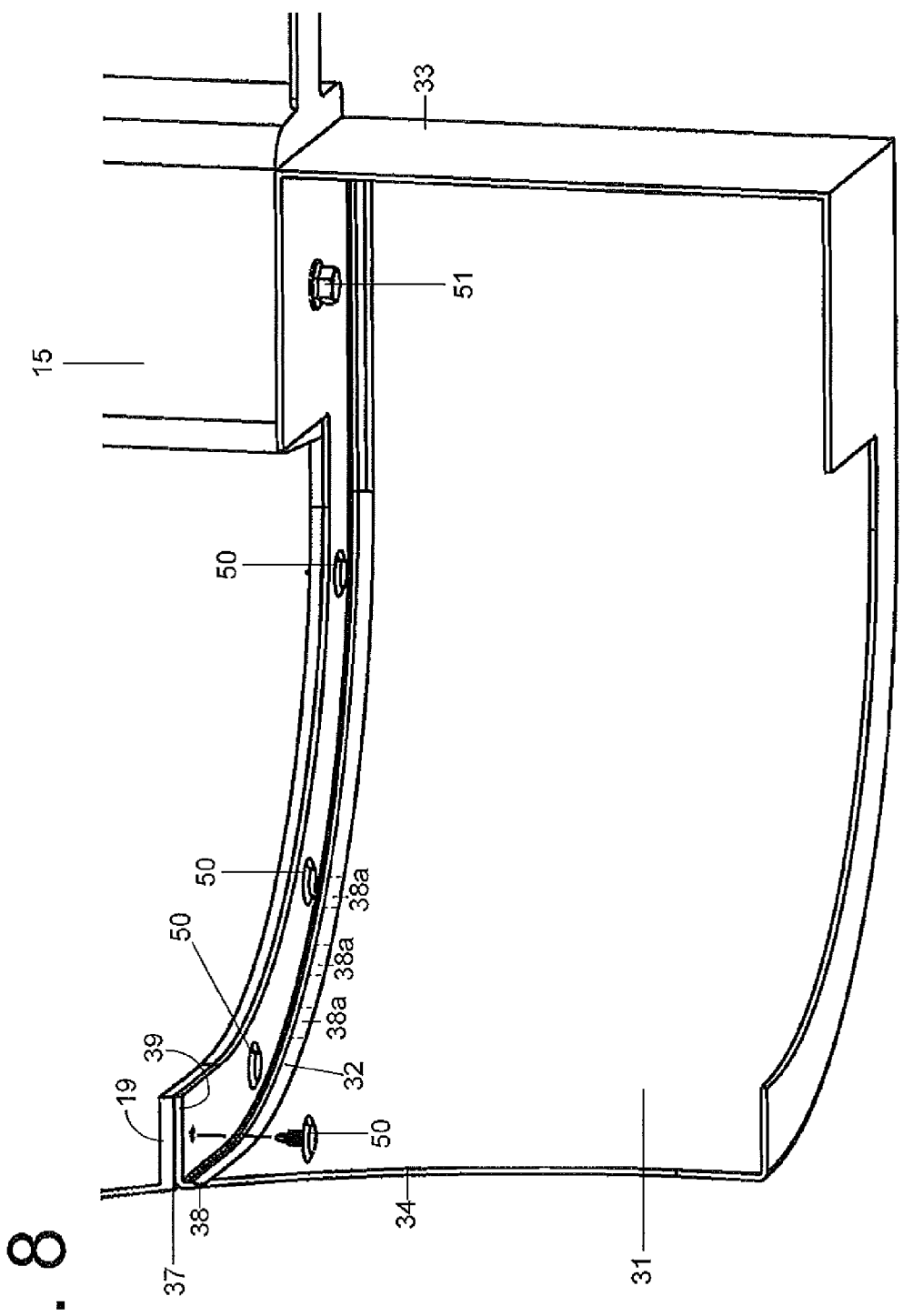
FIG. 8 shows a close up view of a rear side of a bumper end cap and an interior of a hood according to one embodiment of the present invention.

Turning now to FIG. 8, a means for pivoting the bumper end caps 30, 31 relative to the hood 15 during an impact to the bumper end caps 30, 31 is depicted. As shown therein, the means includes at least one releasable attachment 50 and a pivot point attachment 51 that connect the first bumper end cap 30 to the hood 15 and at least one other releasable attachment 50 and another pivot point attachment 51 that connect the second bumper end cap 31 to the hood 15.

According to one aspect of the present embodiment, the releasable attachments 50 releasably connect the bumper end caps 30, 31 to the hood 15. According to one aspect of the present embodiment, the releasable attachments 50 may threadably fasten the bumper end caps 30, 31 to the hood 15. According to another aspect of the present embodiment, the releasable attachments 50 may extend through the bumper end caps 30, 31 and be snap fit to the hood 15. Those of ordinary skill in the art will appreciate that threadable and snap fit fasteners are just one example within the scope of the present invention and that it is within the scope of the present invention to provide a multitude of attachments for releasably attaching the bumper end caps 30, 31 to the hood.

Advantageously, the releasable attachments 50 are configured to connect the bumper end caps 30, 31 to the hood 15 during non-impact situations and to break away or release from at least one of the bumper end caps 30, 31 or the hood 15 during an impact to the bumper end caps 30, 31 of sufficient force to cause damage to the hood 15. By way of example, and not limitation, in the case of an impact to the bumper end caps 30, 31, the releasable attachments 50 may fracture or releasably snap to disengage from the hood 15 and/or the bumper end caps 30, 31.

According to another aspect of the present embodiment, the pivot point attachments 51 connect the first and second bumper end caps 30, 31 to the hood 15 whereby the first and second bumper end caps 30, 31 are pivotable about the pivot point attachments 51 and relative to the hood 15 when the first and second bumper end caps 30, 31 are unconnected to the hood 15 via the releasable attachments 50. According to one aspect of the present embodiment, the pivot point attachment 51 may threadably fasten the bumper end caps 30, 31 to the hood 15. According to another aspect of the present embodiment, the pivot point attachment may extend through the bumper end caps 30, 31 and be snap fit to the hood 15. Those of ordinary skill in the art will appreciate that a bolt is just one example within the scope of the present invention and that it is within the scope of the present invention to provide a multitude of pivot point attachments types, whereabout the bumper end caps 30, 31 may pivot.

Figure 9:
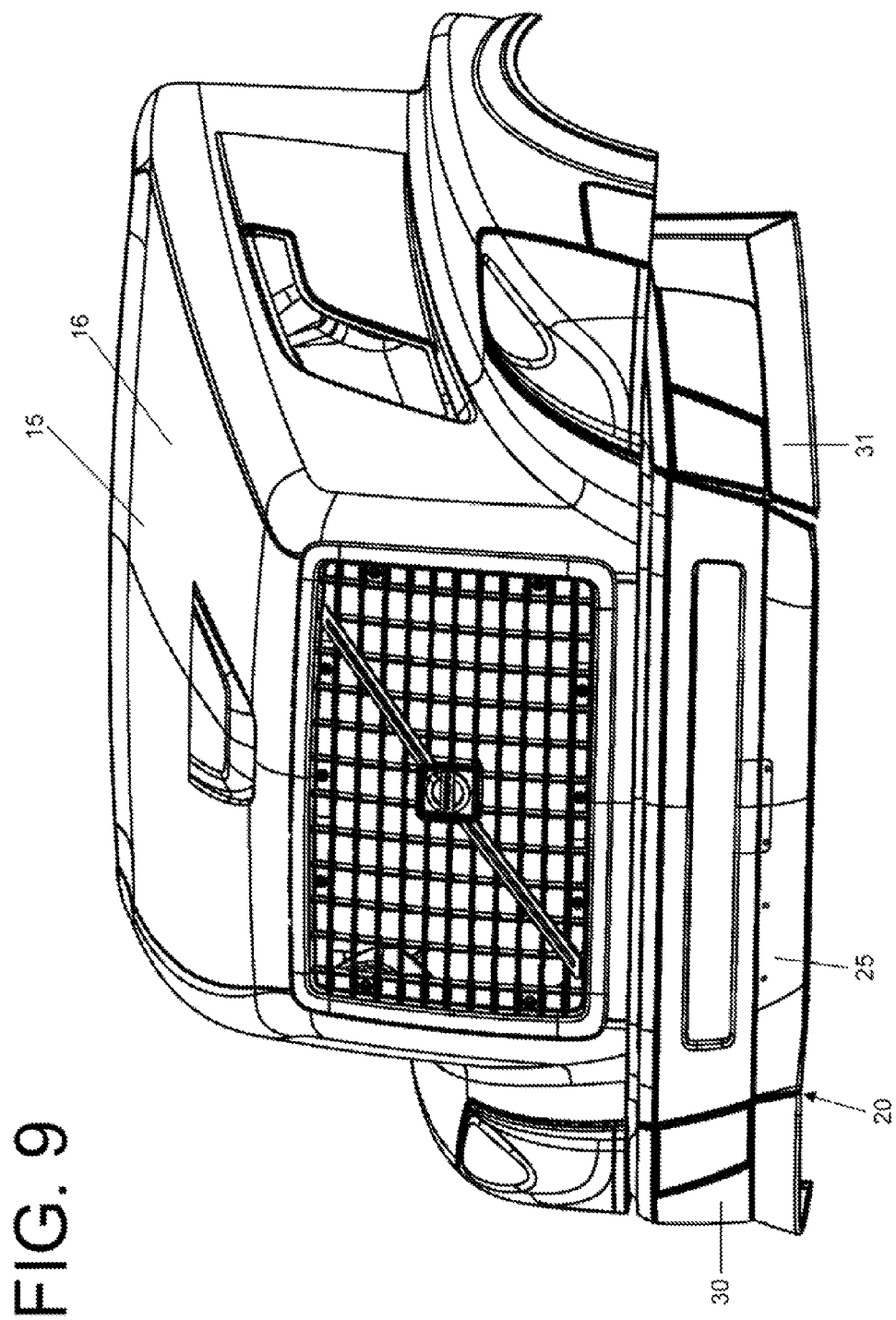
FIG. 9 shows a forward view of a vehicle hood and a bumper end cap pivoting relative to the vehicle hood according to one embodiment of the present invention.

In the present embodiment shown, the pivot point attachments 51 are preferably located inboard relative to the one or more releasable attachments 50 used to releasably connect the bumper end caps 30, 31 to the hood 15. Turning now to FIG. 9, during an impact to the first and second bumper end caps 30, 31 of sufficient force to damage the hood 15, the releasable attachments 50 may release in a manner whereby they cease connecting the bumper end caps 30, 31 to the hood 15, whilst the pivot point attachments 51 provides a more robust attachment to the hood 15, whereby the pivot point attachment 51 may continue to maintain a connection between the bumper end caps 30, 31 and the hood. As shown in FIG. 9, the bumper end caps 30, 31 may then pivot about the pivot point attachments 51.

Those of ordinary skill in the art will appreciate that the energy delivered to the bumper end caps 30, 31 during such an impact is dissipated or alleviated to at least a certain extent by movement of the bumper end caps 30, 31. Accordingly, in addition to providing a means for preventing or limiting impact damage to the hood 15 during impacts to the bumper end caps 30, 31, the releasable attachment 50 and pivot point 51 attachment arrangement may also provide means for preventing damage to the bumper end caps 30, 31 during an impact to the bumper end caps 30, 31.

Those of ordinary skill in the art will appreciate that while the pivoting action previously discussed may suffice to limit or prevent damage to the hood during relatively light impacts, during relatively heavier impacts to the bumper end caps 30, 31 damage to the hood 15 may result since the bumper end caps 30, 31 are connected to or associated with the hood 15 via the pivotable attachment 51. Accordingly, during relatively heavier impacts, it may be desirable to configure at least a portion of the bumper end caps 30, 31 to disassociate from the hood 15 during an impact to the bumper end caps 30, 31 of sufficient force to damage the hood in order to prevent or limit costly damage to the hood 15.

Figure 10:
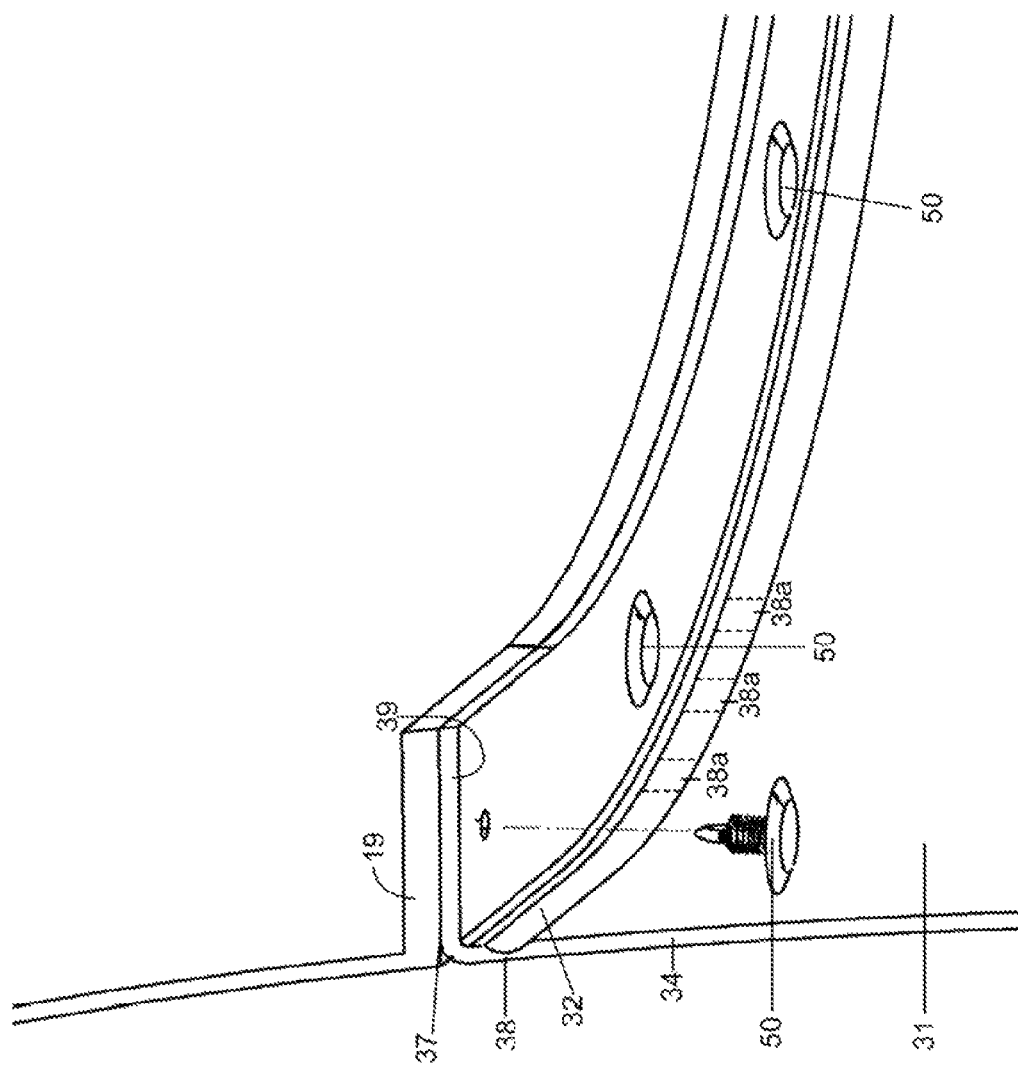
FIG. 10 shows a close up view of a rear side of a bumper end cap and an interior of a hood according to one embodiment of the present invention.

Turning now to FIGS. 8 and 10, a means for disassociating at least a portion of the bumper end carps 30, 31 from the hood 15 during an impact to the bumper end caps 30, 31 is shown. In the presently preferred illustrated embodiment, the means includes a fracture portion 32, which is designed to fracture or break during an impact to the bumper end caps 30, 31 of sufficient force to damage the hood 15. In the present embodiment, the fracture portion 32 is a thinned wall area 38 of the bumper end caps 30, 31 that extends from a first end 33 adjacent to the intermediate portion 25 to an opposing second end 34, which in the present embodiment defines a portion of the wheel wells 14a, 14b. As shown, the fracture portions 32 on each bumper end cap 30, 31 may be preferably positioned adjacent to a joint 37 between the bumper end caps 30, 31 and the hood 15. Advantageously, during a relatively heavy impact, the fracture portion 32 is configured to fracture for purposes of disassociating at least a portion of the bumper end caps 30, 31 from the hood 15. For example, and not limitation, in the present embodiment, shown in FIGS. 8 and 10, the portion 35 of the bumper end caps 30, 31 below the fracture portion 32 may disassociate from an upper portion 26 of the bumper end caps 30, 31 above the fracture portion 32, which may remain connected to the hood 15 via the pivot point attachment 51.

Those of ordinary skill in the art will appreciate that the fracture portion may be a thinned wall section as shown or may be provided with a variety of other configurations. By way of example, in an alternative embodiment a fracture portion 32a may be provided that includes a plurality of cutouts or perforations 38a, which may be located adjacent to the joint 37 between the bumper end caps 30, 31 and the hood 15. Although a only a few perforations 38a are depicted, in a similar manner as shown in relation to the thinned wall area 38, within the scope of the present embodiment, the perforations 38a may extend from a first end 33 adjacent to the intermediate portion 25 to an opposing second end 34 of the bumper end caps 30, 31.

By way of yet another example, a fracture portion 32c may be provided on the bumper end cap side 39 of the joint 37. As shown best in FIG. 10, the bumper end cap side 39 of the joint 37 may be provided with a thickness that is less than a thickness of a hood site 19 of the joint 37. Alternatively, the bumper end cap side 39 of the joint may be fabricated from a material that is structurally weaker than the material of the hood side 19 of the joint 37. In such manners and similar manners, during a relatively heavy impact, the portion of the bumper end cap side 39 of the joint 37 that extends around the pivot point attachment 51 may fracture in order to dissociate the bumper end caps 30, 31 from the hood 15.

By way of yet still one other example, the means may include the pivot point attachment 51, which may fracture or releasably snap to disassociate the bumper end caps 30, 31 from the hood 15.

Figure 11:
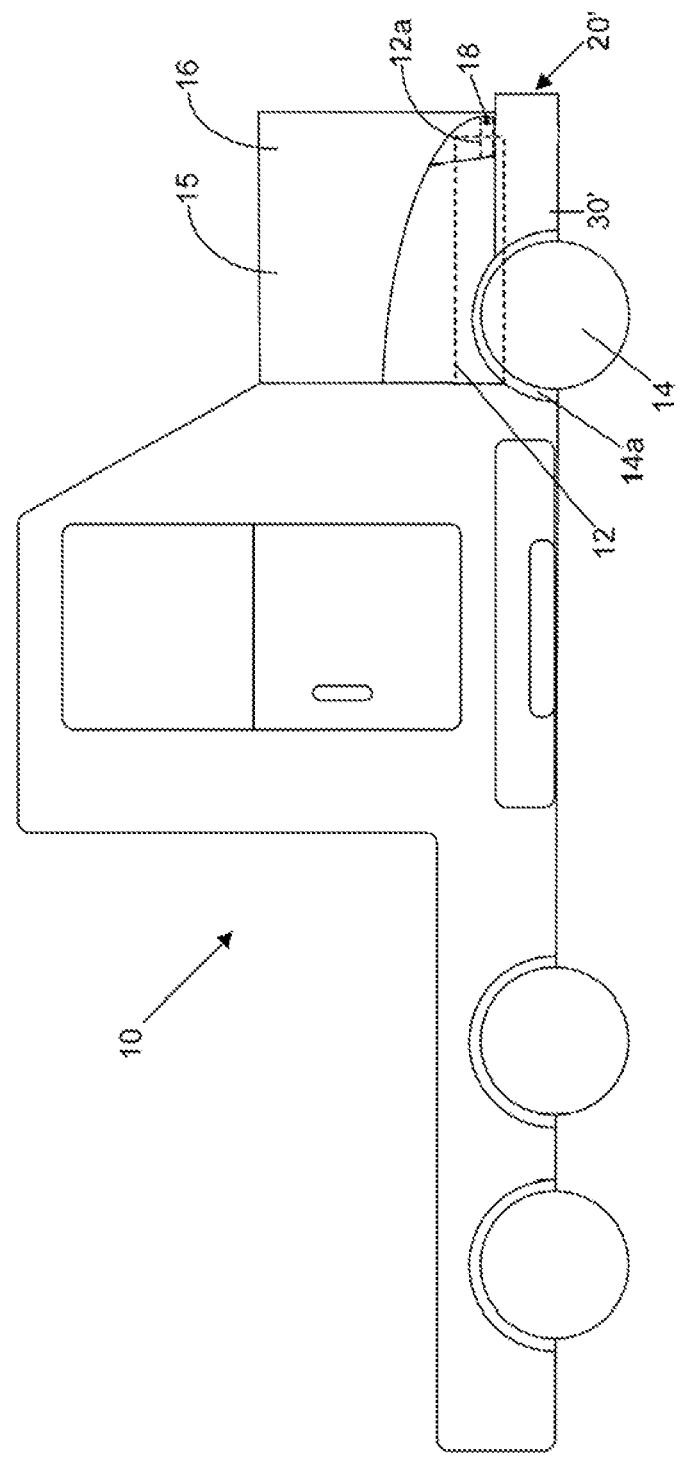
FIG. 11 shows a side view of a vehicle with a hood in a dosed position and a bumper according to one embodiment of the present invention.
Figure 12:
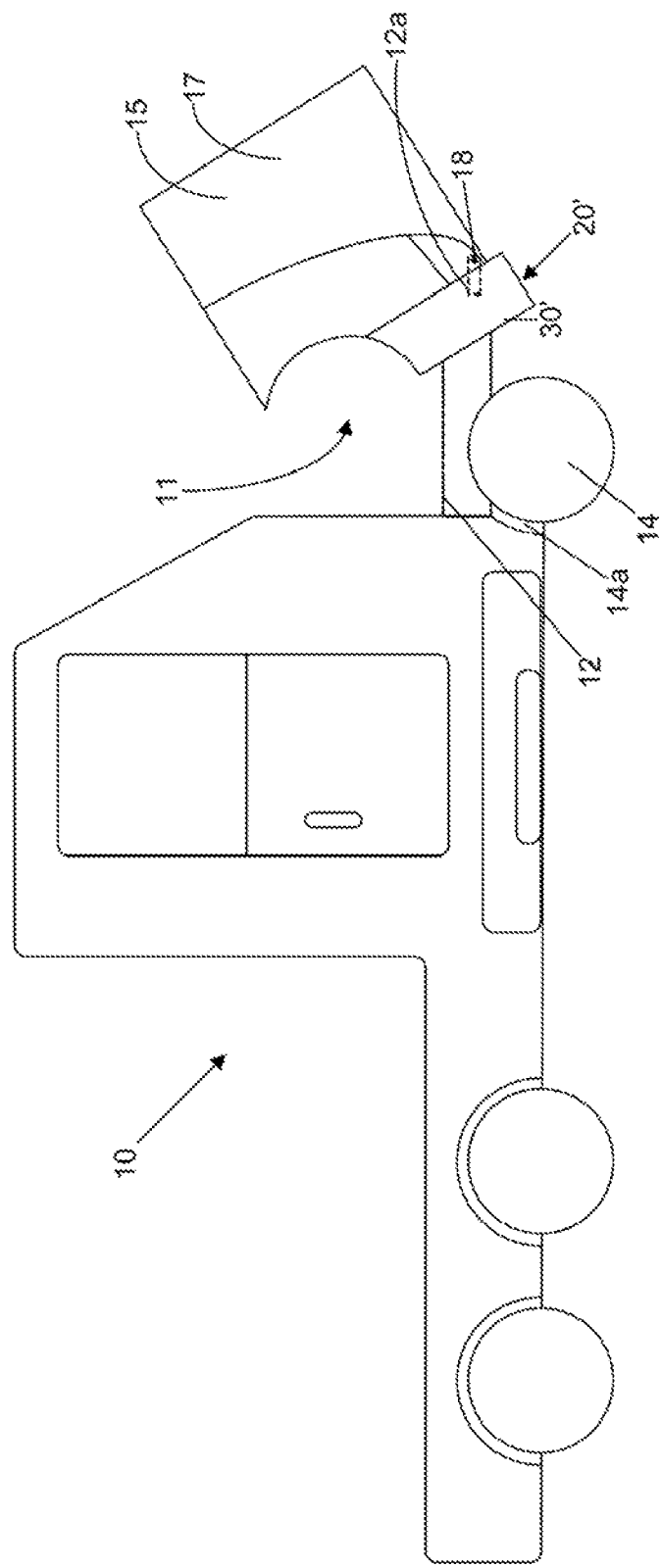
FIG. 12 shows a side view of a vehicle with a hood in an open position and a bumper according to one embodiment of the present invention.
Figure 13:
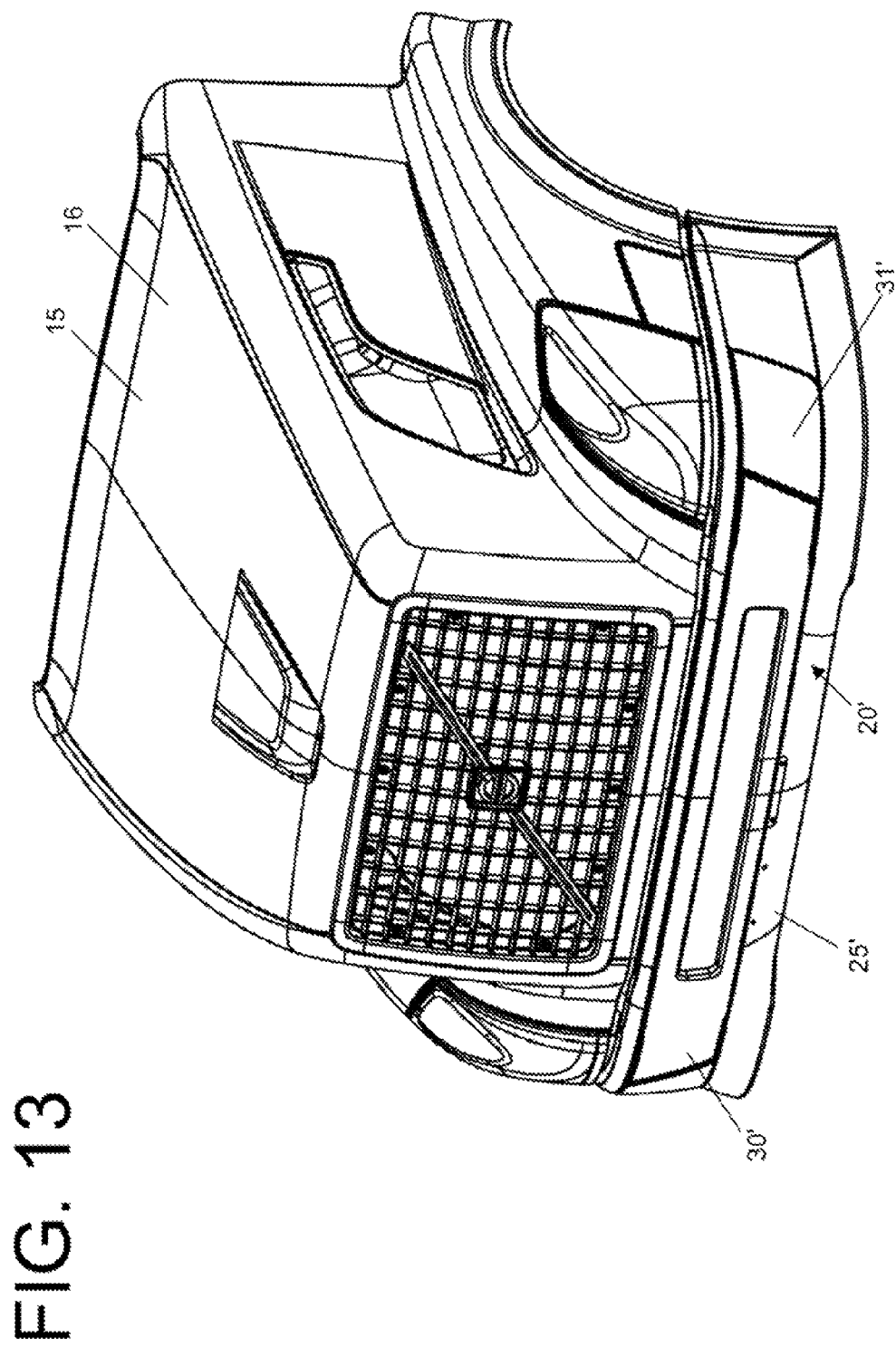
FIG. 13 shows a forward perspective view of a vehicle hood in a closed position and a bumper according to one embodiment of the present invention.

Turning now to FIGS. 11-13, a bumper 20' of an alternative embodiment is depicted. The bumper 20' shown in FIGS. 11-13 is similar to the bumper 20 shown in FIGS. 1-10 except that the bumper 20' including the intermediate bumper portion 25' is supported by the hood 15, whereby the bumper 20', including the intermediate bumper portion 25' and the bumper end caps 30, 31, moves with the hood 15 as it transitions between the open and closed positions 16, 17.

As shown, the bumper 20' may be a one-piece unitary bumper 20' that includes an intermediate bumper portion 25' located between bumper end caps 30', 31'. Although the present embodiment depicts the bumper 20' as a unitary bumper, it is within the scope of the present embodiment to provide the bumper 20' as a plurality of discrete sections, for example, but not limitation, 3 discrete sections, similar to that shown in FIGS. 1-10.

According to another aspect of the present embodiment, as discussed in relation to the bumper end caps 30, 31 of the embodiment shown in FIGS. 1-10, the bumper 20', including the intermediate portion 25' and the bumper end caps 30', 31, is provided with means for preventing or limiting damage to the hood 15 during impacts to the bumper 20', including the intermediate bumper portion 25' and the bumper end caps 30', 31'. According to yet another aspect of the present embodiment, the means for preventing or limiting damage to the hood 15 during impacts to the bumper 20' may include a means for pivoting the bumper end caps 30', 31' relative to the hood 15 during an impact to the bumper end caps 30', 31'. Those of ordinary skill in the art will appreciate that bumper end caps 30', 31' may be discrete sections and may pivot relative to the hood 15 and the intermediate bumper portion 25' during impacts in a similar manner as discussed in relation to the bumper end caps 30, 31 of the embodiment shown in FIGS. 1-10.

According to still yet another aspect of the present embodiment, the means for preventing damage to the hood 15 during impacts to the bumper 20' may include a means for disassociating at least a portion of the bumper 20', including the intermediate bumper portion 25' and the bumper end caps 30', 31', from the hood 15, during impacts to the bumper 20'. Those of ordinary skill in the art will appreciate that the intermediate bumper portion 25' and bumper end caps 30', 31' may disassociate from the hood 15 in a similar manner as discussed in relation to the bumper end caps 30, 31 shown in the embodiment shown in FIGS. 1-10.

The detailed descriptions of the above embodiments are not exhaustive descriptions of all embodiments contemplated by the inventors to be within the scope of the invention. The present description depicts specific examples to teach those skilled in the art how to make and use the best mode of the invention. For the purpose of teaching inventive principles, some conventional aspects have been simplified or omitted. For example, those of ordinary skill in the art will appreciate that a relatively robust bar (not shown) may be placed behind the bumpers 20, 20' and attached to the frame 12, which could protect the truck from heavy impacts. Such a bar may extend behind the intermediate bumper portion 25, 25' and the bumper end caps 30, 31, 30', 31'.

Those skilled in the art will appreciate variations from these examples that fall within the scope of the invention. Persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Thus, although specific embodiments of, and examples for, the invention are described herein for illustrative purposes, various equivalent modifications are possible within the scope of the invention, as those skilled in the relevant art will recognize. Accordingly, the scope of the invention is determined from the appended claims and equivalents thereof.

I claim:

1. A vehicle, comprising:
   a frame;
   a hood provided with an open position and a closed position;
   a bumper provided with three discrete sections including an intermediate bumper portion, a first bumper end cap, and a second bumper end cap, wherein:
      the intermediate bumper portion is located between the first and second bumper end caps and is supported by the frame, whereby the hood moves relative to the intermediate bumper portion as the hood transitions between the open and closed positions; and
      the first and second bumper end caps are supported by the hood and are moveable with the hood as the hood transitions between the open and closed positions.

2. A vehicle, comprising:
   a frame;
   a hood provided with an open position and a closed position;
   a bumper provided with;
      an intermediate bumper portion;
      a first bumper end cap and a second bumper end cap, wherein:
         the first and second bumper end caps are supported by the hood and are moveable with the hood as the hood transitions between the open and closed positions;
         the first bumper end cap is provided with means for preventing or limiting damage to the hood during impacts to the first bumper end cap; and
         the second bumper end cap is provided with means for preventing or limiting damage to the hood during impacts to the second bumper end cap.

3. The vehicle according to claim 2, wherein the intermediate bumper portion is supported by the frame, wherein the hood moves relative to the intermediate bumper portion as the hood transitions between the open and closed positions.

4. The vehicle according to claim 2, wherein the intermediate bumper portion is supported by the hood and is moveable with the hood as the hood transitions between the open and closed positions.

5. The vehicle according to claim 2, wherein the means for preventing or limiting damage to the hood during impacts to the first and second bumper end caps consists of a means for pivoting the bumper end caps relative to the hood during an impact to the bumper end caps.

6. The vehicle according to claim 2, wherein the means for preventing or limiting damage to the hood during impacts to the first and second bumper end caps consists of a means for disassociating at least a portion of the bumper end caps from the hood during an impact to the bumper end caps.

7. The vehicle according to claim 2, wherein the intermediate bumper portion:
   is supported by the hood;
   is moveable with the hood as the hood transitions between the open and closed positions; and
   includes means for disassociating from at least a portion of the intermediate bumper portion from the hood during an impact to the intermediate bumper portion.

8. The vehicle according to claim 2, wherein the intermediate bumper portion and bumper end caps are discrete sections of the bumper and the intermediate bumper portion:
   is supported by the hood;

is moveable with the hood as the hood transitions between the open and closed positions; and includes means for disassociating from at least a portion of the intermediate bumper portion from the hood during an impact to the intermediate bumper portion.

9. The vehicle according to claim 2, wherein the intermediate bumper portion and bumper end caps form a unitary bumper and the intermediate bumper portion:
is supported by the hood;
is moveable with the hood as the hood transitions between the open and closed positions; and
includes means for disassociating from at least a portion of the intermediate bumper portion from the hood during an impact to the intermediate bumper portion.

10. A vehicle, comprising:
a frame;
a hood provided with an open position and a closed position;
a bumper provided with three discrete sections including an intermediate bumper portion, a first bumper end cap, and a second bumper end cap, wherein:
the first and second bumper end caps are supported by the hood and are moveable with the hood as the hood transitions between the open and closed positions;
at least one releasable attachment releasably connects the first bumper end cap to the hood;
at least one other releasable attachment releasably connects the second bumper end cap to the hood;
a first pivot point attachment connects the first bumper end cap to the hood whereby the first bumper end cap is pivotable about the first pivot point attachment and relative to the hood when the first bumper end cap is unconnected to the hood via the at least one releasable attachment; and
a second pivot point attachment connects the second bumper end cap to the hood whereby the second bumper end cap is pivotable about the second pivot point attachment and relative to the hood when the second bumper end cap is unconnected to the hood via the at least one other releasable attachment.

11. A method for preventing damage to a vehicle hood supporting first and second bumper end caps that are moveable with the hood as the hood transitions between open and closed positions, the method comprising the steps of:
configuring at least a portion of the first bumper end cap to disassociate from the hood during an impact to the first bumper end cap of sufficient force to damage the hood; and
configuring at least a portion of the second bumper end cap to disassociate from the hood during an impact to the second bumper end cap of sufficient force to damage the hood.

12. The method according to claim 11, wherein the method further comprises the steps of:
configuring the first bumper end cap to pivot relative to the hood during an impact to the first bumper end cap of sufficient force to damage the hood; and
configuring the second bumper end cap to pivot relative to the hood during an impact to the second bumper end cap of sufficient force to damage the hood.

13. The method according to claim 12, wherein the steps of configuring the first and second bumper end caps to pivot relative to the hood during impacts to the first and second bumper end caps includes the steps of:

providing each of the first and second bumper end caps with at least one releasable attachment that releasably connect the first and second bumper end caps to the hood; and
providing each of the first and second bumper end caps with a pivot point attachment that connect the first and second bumper end caps to the hood, wherein the first and second bumper end caps are pivotable about the pivot point attachment and relative to the hood when the first and second bumper end caps are unconnected to the hood via the releasable attachments.

14. The method according to claim 11, wherein the vehicle hood further supports an intermediate bumper portion that is moveable with the hood as the hood transitions between open and closed positions, the method further comprising the step of:
configuring at least a portion of the intermediate bumper portion to disassociate from the hood during an impact to the intermediate bumper portion of sufficient force to damage the hood.

15. The method according to claim 14, wherein the method further comprises the steps of:
configuring the first bumper end cap to pivot relative to the hood and the intermediate bumper portion during an impact to the first bumper end cap of sufficient force to damage the hood; and
configuring the second bumper end cap to pivot relative to the hood and the intermediate bumper portion during an impact to the second bumper end cap of sufficient force to damage the hood.

16. The vehicle according to claim 14, wherein the intermediate bumper portion and bumper end caps are discrete sections of the bumper.

17. The vehicle according to claim 14, wherein the intermediate bumper portion and bumper end caps form a unitary bumper.

18. A method for preventing damage to a vehicle hood supporting first and second bumper end caps that are moveable with the hood as the hood transitions between open and closed positions, the method comprising the steps of:
configuring the first bumper end cap to pivot relative to the hood during an impact to the first bumper end cap of sufficient force to damage the hood; and
configuring the second bumper end cap to pivot relative to the hood during an impact to the second bumper end cap of sufficient force to damage the hood.

19. The method according to claim 18, wherein the steps of configuring the first and second bumper end caps to pivot relative to the hood during impacts to the first and second bumper end caps includes the steps of:
providing each of the first and second bumper end caps with at least one releasable attachment that releasably connect the first and second bumper end caps to the hood; and
providing each of the first and second bumper end caps with a pivot point attachment that connect the first and second bumper end caps to the hood, wherein the first and second bumper end caps are pivotable about the pivot point attachment and relative to the hood when the first and second bumper end caps are unconnected to the hood via the releasable attachments.

* * * * *